Patented Mar. 4, 1924.

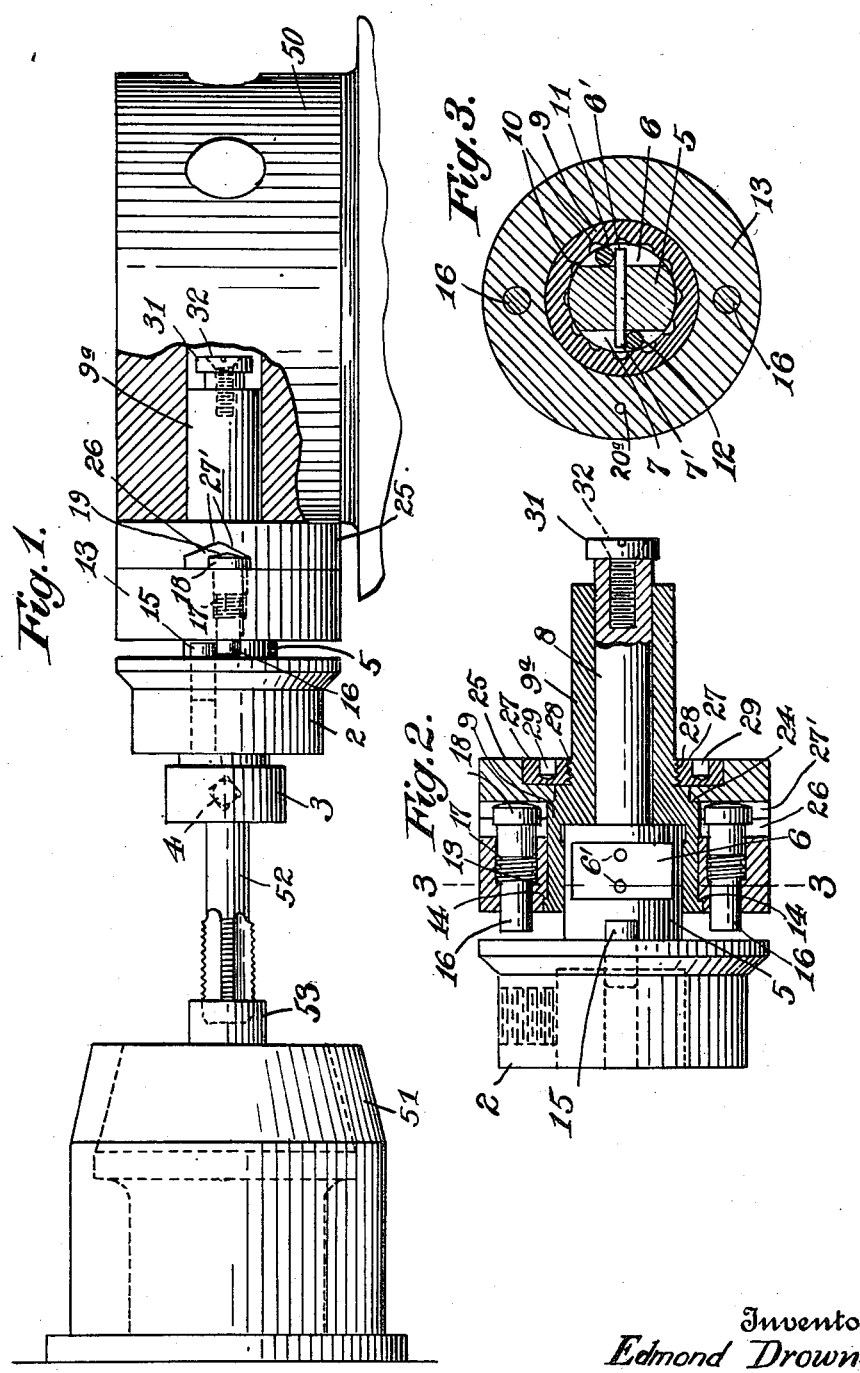

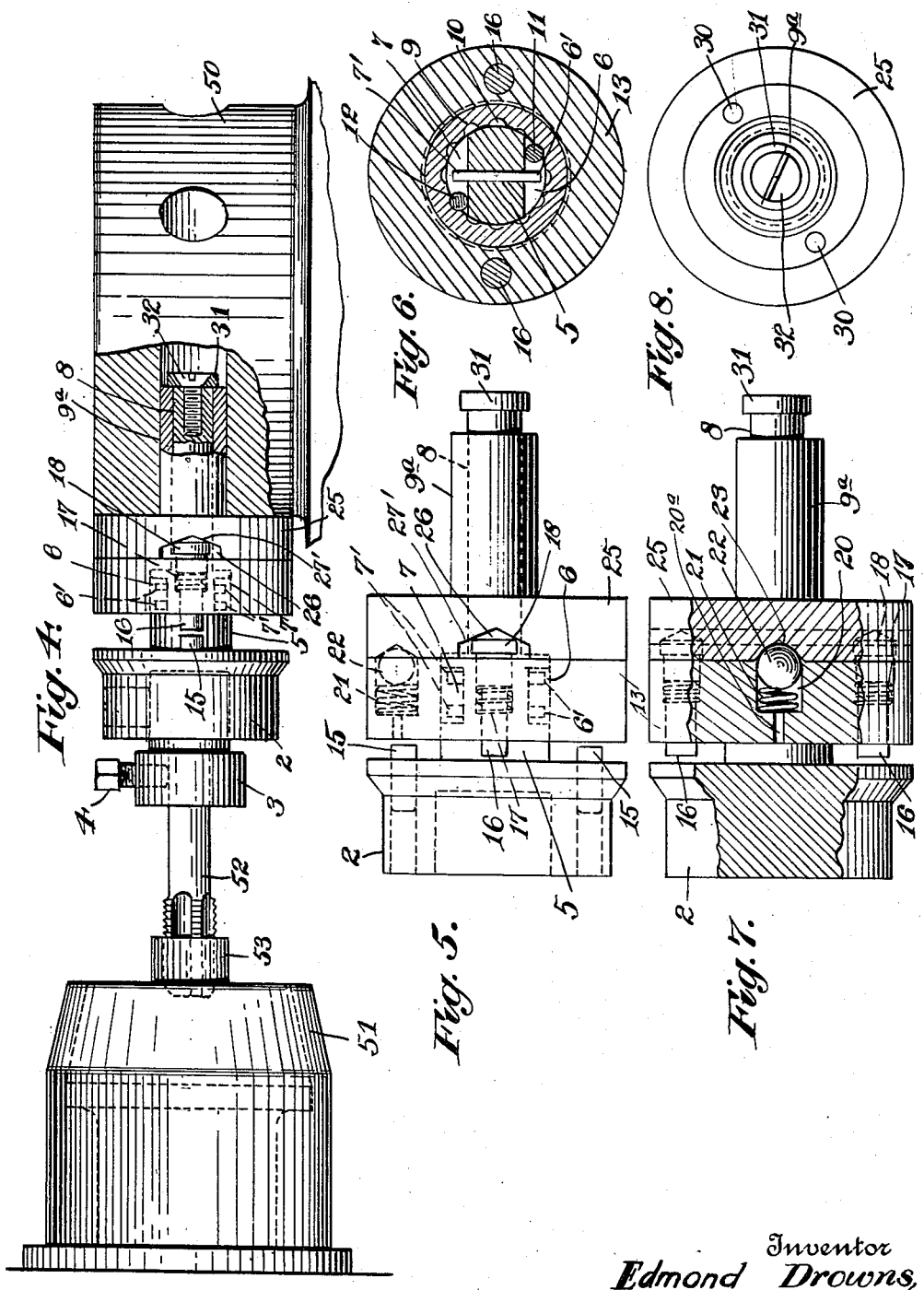

1,485,454

UNITED STATES PATENT OFFICE.

EDMOND E. DROWNS, OF CLEVELAND, OHIO, ASSIGNOR TO THE NATIONAL ACME COMPANY, OF CLEVELAND, OHIO, A CORPORATION OF OHIO.

REVERSIBLE TAP AND DIE HOLDER.

Application filed June 2, 1921. Serial No. 474,376.

*To all whom it may concern:*

Be it known that I, EDMOND E. DROWNS, a citizen of the United States, residing at Cleveland, in the county of Cuyahoga, and State of Ohio, have invented certain new and useful Improvements in Reversible Tap and Die Holders, of which the following is a specification.

This invention relates to reversible tap or die holders, an object of the invention being to provide a simple, effective, durable, and easily operated holder for threading tools wherein not only any danger of damage to the holder or to the threading tool when releasing the same from the work, after the same has been carried to the desired depth, is eliminated, but also any danger or possibility of damage to the driving pins, due to clipping or knocking upon releasing the tool from the work, is eliminated.

Other objects of this invention will appear in the following description thereof reference being had to the accompanying drawings forming a part of the specification wherein like reference characters indicate corresponding parts in the several views and wherein Fig. 1 is a view partly in section illustrating in a general way a work spindle and a tap or die turret with this improved tap or die holder attached thereto, and carrying in the present instance a tap; Fig. 2 is a side view partly in section of this improved holder; Fig. 3 is a sectional view taken substantially on line 3—3 of Fig. 2; Fig. 4 is a side view partly in section similar to Fig. 1, but illustrating another position of the parts; Fig. 5 is a side view of my improved holder; Fig. 6 is a sectional view similar to Fig. 3 but illustrating another position of the parts; Fig. 7 is a side view partly in section similar to Fig. 5 but illustrating another position of the parts; and Fig. 8 is an end view thereof with the retaining collar removed.

My improved tap or die holder, a preferred form thereof herein shown and described, and which is an improvement over my co-pending application for a reversible tap or die holder, Serial No. 384,075, filed May 25, 1920, comprises a bored holder member or body 2 in the bore of which the tap or die holding means 3 is suitably secured as by means of a set screw 4. This member 2 is provided with a rearwardly extending shank 5, which is provided at opposite diametrical sides with a pair of slabbed-off or recessed portions 6 and 7, in each of which is located centrally a pair of stop pins 6' and 7' respectively. Projecting from this shank is a rearwardly extending shank 8 of less diameter, and mounted upon the two shanks is a companion member 9 having a bore corresponding with the bore of the large shank portion 5 and a rearwardly extending sleeve 9ª, bored to correspond with the smaller shank 8 of the member 2.

The inner surface of the member 9 is formed with multiple milled, circular, grooved stations 10, equally spaced apart. Located in the recesses 6 and 7 to cooperate with the stop pins 6' and 7' are a pair of shiftable gripping rollers or pins 11 and 12 adapted to cooperate with the milled, circular stations in the bore of the member 9. It will be noted that the stop pins 6' and 7' project centrally into recesses 6 and 7 respectively, and a roller 11 is located in recess 6 at one side of stop pins 6' while roller 12 is located in recess 7 at the opposite side of stop pins 7'. These stop pins function to limit the movement of the rollers toward the central part of the recesses.

A driving ring or sleeve 13 is freely mounted over the member 9, a shoulder being provided in the bore thereof to abut against a shoulder formed on the member 9 as illustrated at 14 in Fig. 2. The juxtaposed faces of the members 2 and 13 are provided with cooperating mating driving pins 15 and 16 whereby when they are in contact both members will have a limited circumferential or rotative movement together in one direction or the other relatively to member 9, which is fixed to the turret 50 at all times, and when they are free the member 2 will rotate with the work relatively to the other. In the present instance the driving pins 15 are secured to the member 2 in any suitable manner and the driving pins 16 on the other hand are mounted in a suitable bore for axial shiftable movement. A spring 17 is mounted in a counter bore and surrounds each pin 16 tending normally to shift the same rearwardly. The driving pins 16 are provided with heads 18, the rear faces thereof being formed with conical cam surfaces 19. As illustrated in Fig. 7 the member 13 is bored at 20ª and counterbored to provide a recess 20 for the purpose of seating and housing a ball spring 21 and a centering ball or ball plunger 22. At a suitable distance to the rear of the driving sleeve 13 the member 9 is reduced in diameter to form a shoulder 24, and a camming sleeve 25 suitably bored fits over this shoulder portion of the member 9. Diametrically across the inner face of the camming sleeve 25 is milled a slot or groove 26, the base of this groove being provided with camming surfaces, in the present instance the same being preferably conical and the angular walls 27' thereof forming the cam faces or surfaces adapted to cooperate with the camming heads 18 of the driving pins 16. The angular walls 27' of the notch or groove 26 permit the die or tap to cut either right or left handed threads, since it will be seen that the cam head 18 will ride up upon either of the reverse cam surfaces 27' depending upon the direction in which the ring or sleeve 13 is shifted by member 2 in operation. The camming sleeve 25 is also provided with a conical recess 23 wherein is normally housed the centering ball 22, the spring 21 exerting tension upon the ball thereby tending to centralize the same in the recess 23.

The outer face of the camming ring or sleeve 25 is counter-bored to a suitable depth or diameter within which is housed a retaining collar 27 threaded as at 28 to the shank or sleeve 9$^a$ thereby properly positioning the members 13 and 25 when assembled. A pair of holes 29 may be machined into the face of the collar for the purpose of screwing the same into position. As illustrated in Fig. 8 suitable holes are bored through the rear face of the sleeve 25 for the reception of pins 30 which project into notches (not shown) formed in the shank 9 thereby serving as a precautionary measure to prevent relative movement of the members 25 and 9. The two members 2 and 9 are maintained assembled by means of a collar 31 and a screw 32 secured to the rear end of shank 8.

As shown in Figs. 1 and 4 this improved holder is attached to a tap or die turret 50 and carries a tap 52 operating upon the work 53 carried by the work spindle 51. In operation (referring to Fig. 1) it will be seen that the tap has entered the work and the driving pins 15 and 16 are in engagement, thereby causing the driving member 13 to be driven by the member 2, and, by virtue of the strain of the cutting, the member 13 is shifted circumferentially relatively to the cam member 25 causing the cam ends 18 of the pins 16 to travel up over the cam surfaces 27' thereby shifting the pins to their extreme forward operative position, and forcing the cam ends of the pins against the side walls of the camming slots 26. The pins, it will be understood, are shifted to this position by virtue of the pressure of the driving pins 15 against the outer ends of the driving pins 16. Simultaneously with the camming of the pins 16 forwardly, the driving ring 13 is rotated to an extent corresponding to the movement of cam ends 18 over the cam surfaces 27' and hence the centering ball 22 is shifted or cammed out from its central position in the ball seat 23, thereby forcing the centering ball into the hole 20 and placing the ball spring 21 under tension.

When, however, the threading of the work is completed and the forward movement of the threading tool upon the work has ceased, the member 2 will continue to follow the threads and will be drawn forward sufficiently to disengage the pins 15 and 16. Thereupon the member 2 will have a rotary movement with the work independent of the member 13. This is obtained by reason of the fact that the grip pins 11 and 12 will be moved toward the central portion of the recesses 6 and 7 into engagement with the stop pins 6' and 7' as illustrated in Fig. 3. In this position of the rollers or grip pins 11 and 12 the same will ride over the grooves 10, and permit member 2 to rotate freely with the work relatively to members 13 and 9, but upon reversing the direction of rotation of the work in order to unscrew the tap therefrom, the holder or body 2 with the shank 5 will be rotated in the opposite direction. Thereupon the pins 11 and 12 will be shifted from contact with the stop pins 6' and 7' toward the outer portions of the recesses 6 and 7 to the position illustrated in Fig. 6. In this position however of the rollers or gripping pins the same will be forced into the grooved stations 10 thereby locking the parts 2 and 9 together, and permitting the work to rotate independently of the member 2, and thus release itself automatically from the threading tool. By referring for instance to Fig. 6 it will be readily observed that by rotating portion 5 of the member 2 clockwise relatively to member 9, the roller grip pins 11 and 12 will be forced to the position shown and into the grooved stations, but upon rotating member 5 counter-clockwise relatively to the member 9, the rollers 11 and 12 will move to engage the stop pins 6' and 7', and in this position the depth of the recess prevents engagement of the grip pins with the grooved stations, see Fig. 3.

Thus when the tap or die has entered the work to the required distance, due to the forward axial movement of the member 2 relatively to the member 13, the cooperating driving pins 15 and 16 are disengaged and simultaneously therewith the springs 17 will shift the pins 16 rearwardly and force the conical or cam ends 18 of the pins to travel over the cam surfaces 27' to the central position illustrated in Fig. 4. The travel of pins 16 rearwardly over cam surfaces 27' rotates ring 13 thereby bringing the recess 20 substantially in alinement with camming recess 23, whereupon the ball spring 21, exerting outward pressure upon the centering ball 22, will force the centering ball back into its conical or cam shaped seat of recess 23. The centering ball 22 with its spring thus acts as a releasable locking plunger normally operative to hold the members 13 and 25 in proper position but releasable upon positive relative movement of these members.

Thus it will be readily seen that simultaneously upon the disengagement of the driving pins, as hereinbefore described, the mating pins 16 will recede or be shifted rearwardly, thereby positively clearing the cooperating driving pins and eliminating all danger of the pins knocking and thereby avoiding unnecessary wear and breakage of the parts.

Although I have described my invention in its preferred form it is to be understood that I do not limit myself to the construction herein shown and described except in so far as defined in the claims and embraced within the scope thereof.

I claim as my invention:

1. In a holder for a threading tool the combination of a body member, a driving pin therefor, and a pair of relatively movable members, one thereof having a driving pin and a plunger, and the other having cams adapted to coact with said pin and plunger.

2. A holder for a threading tool comprising a pair of body members having between certain of their juxtaposed faces shiftable gripping means effective upon reversing the direction of rotation of one of said members relatively to the other to lock the two together, a driving ring carried by one of said members, cooperating driving pins carried, one by the ring and one by a member, means effective upon the release of said driving pins to shift one out of engagement with the other and comprising a camming ring cooperating with said driving ring, said rings having between certain of their juxtaposed faces a cam surface and a spring actuated means cooperating therewith.

3. A holder for a threading tool comprising a pair of body members having between certain of their juxtaposed faces locking means effective upon reversing the direction of rotation of one of said members relatively to the other to lock the two together, a driving ring carried by one of said members, cooperating driving pins carried, one by the ring and one by a member, means effective upon the release of said driving pins to shift one out of alinement with the other, and comprising a camming ring cooperating with said driving ring, said rings having between certain of their juxtaposed faces a cam surface and a spring actuated ball cooperating therewith.

4. A holder for a threading tool comprising a pair of members having cooperating driving pins for operating one from the other, a camming member having cam surfaces adapted to cooperate with certain of said driving pins, and means operative upon the release of said members to shift said last driving pins into engagement with said cam surfaces thereby to impart to the same an axial movement, said last means comprising a spring controlled centering member.

5. A holder for a threading tool comprising a pair of members having cooperating driving pins for operating one from the other, a camming member having cam surfaces adapted to cooperate with certain of said driving pins, and means operative upon the release of said members to shift said last driving pins into engagement with said cam surfaces thereby to impart to the same an axial movement, said last means comprising a spring controlled centering member, and springs cooperating with said last driving pins.

6. In a holder for a threading tool the combination of a pair of body members, two sets of means for locking said members together at predetermined times, one set comprising companion driving pins including a self-retractable pin, and the other set comprising roller gripping means.

7. In a holder for a threading tool the combination of a pair of body members, a shiftable driving sleeve carried by one member, said sleeve and other member having a pair of cooperating driving means for operating one from the other, one thereof axially self-retractable upon the release of said cooperating means, and a locking plunger operative for releasably holding said driving sleeve in predetermined position.

8. In a holder for a threading tool the combination of a pair of pin-carrying members, a driving pin carried by each member, and a member in rear of one of said members, and of substantially the same diameter, and having a cam surface coacting with the driving pin thereof.

9. In a holder for a threading tool, the combination of a pair of body members, cooperating driving means for operating one from another, means for retracting one of said driving means and for rotating the body member upon disengagement of the driving means, and releasable locking means operative upon the rotation of said body member to hold the same in predetermined position.

10. In a holder for a threading tool, the combination of a pair of body members, cooperating driving means for operating one from another, means for retracting one of said driving means and for rotating the body member upon disengagement of the driving means, and a releasable spring controlled plunger operative upon the rotation of said body member to hold the same in predetermined position.

11. In a holder for a threading tool the combination of supporting members, coacting driving means for said members, means for retracting one of said driving means, shiftable locking means located between certain juxtaposed faces of said supporting members, and releasable plunger means carried by one of said members and effective to hold the same in position at predetermined times.

12. In a holder for a threading tool, the combination of a pair of members, cooperating means for controlling one from the other and releasable to permit one of said members to rotate relatively to the other member, said last member having a spring controlled locking plunger, and cam means cooperating with said plunger.

13. In a holder for a threading tool the combination of a pair of members adapted to be driven one from the other at predetermined times, one of said members having a spring and cam controlled driving pin, and one of said members having a spring and a cam controlled locking plunger.

14. In a holder for a threading tool, the combination of a pair of body members, a mating pin carried by one thereof, a pair of ring-shaped members of substantially the same diameter mounted upon the other body member, and a mating pin carried by one of said ring-shaped members and adapted to cooperate with said first mating pin, one of the ring-shaped members being fixed to its body member and the other shiftable relatively thereto, and one thereof having a cam coacting with the mating pin of the other.

15. In a holder for a threading tool, the combination of a pair of relatively shiftable body members, two sets of means for locking said members together at predetermined times during the operation of the threading tool, one set comprising roller gripping means located between certain of the juxtaposed faces of said members and the other set comprising cooperating driving pins effective to control one member from the other, and means operative upon the rotation of one of said members relatively to the other to shift certain of said driving pins relatively to companion driving pins thereof.

16. A holder for a threading tool comprising a pair of body members having cooperating driving means for operating one from the other and one thereof self-retractable upon the release of said cooperating means, and means cooperating with said self-retractable means for permitting the tool to cut either right and left-handed threads.

17. A holder for a threading tool comprising a pair of body members having cooperating driving means for operating one from the other and one thereof self-retractable upon the release of said cooperating means, and camming means cooperating with said self-retractable means for permitting the tool to cut either right or left-handed threads.

18. A holder for a threading tool comprising body members having cooperating driving means for operating one from another, means for permitting one of said driving means to be shiftable relatively to the other in opposite directions upon predetermined engagement with the other driving means, and means for retracting said shiftable driving means upon disengagement from the other driving means.

19. A holder for a threading tool comprising body members having cooperating driving means for operating one from another, reversely extending camming means for permitting one of said driving means to be shiftable relatively to the other in opposite directions upon predetermined engagement with the other driving means, and means for retracting said shiftable driving means upon disengagement from the other driving means.

20. In a holder for a threading tool, the combination of a pair of relatively shiftable members, two sets of means for locking said members together at predetermined times, one set comprising companion driving pins including a self-retractable pin, and the other set comprising shiftable locking means, and reversely extending cams cooperating with said self-retractable pin for permitting the tool to cut right and left-handed threads.

21. In a holder for a threading tool, the combination of a pair of relatively shiftable members, two sets of means for locking said members together at predetermined times, one set comprising companion driving pins including a self-retractable pin, and the other set comprising roller gripping means, and reversely extending cams cooperating with said self-retractable pin for permitting the tool to cut right and left-handed threads.

22. In a holder for a threading tool, the combination of a pair of members adapted to be driven one from the other at predetermined times, one of said members having a spring and a cam controlled driving pin reversely shiftable to permit the tool to cut right and left handed threads, and a spring and cam controlled locking plunger cooperating with one of the members.

23. In a holder for a threading tool, the combination of a pair of members having cooperating driving means for operating one from the other, means for permitting axial and circumferential shiftable movement of one of said driving means upon predetermined engagement with the other driving means, means for permitting axial and circumferential shiftable movement of said shiftable driving means in a reverse direction by reverse engagement with said other driving means, and means for retracting said shiftable driving means upon disengagement thereof.

Signed at Cleveland, Ohio, this 26th day of May, 1921.

EDMOND E. DROWNS.